Feb. 15, 1944.  W. R. MANSFIELD ET AL  2,341,637
METHOD OF CONSTRUCTING OR BUILDING BONDED LAMINATED MICA INSULATION
Filed April 8, 1941
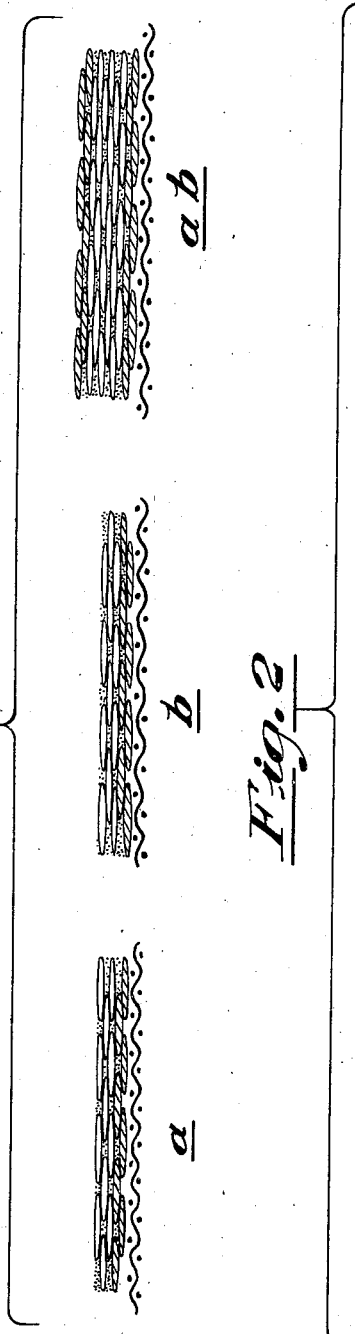
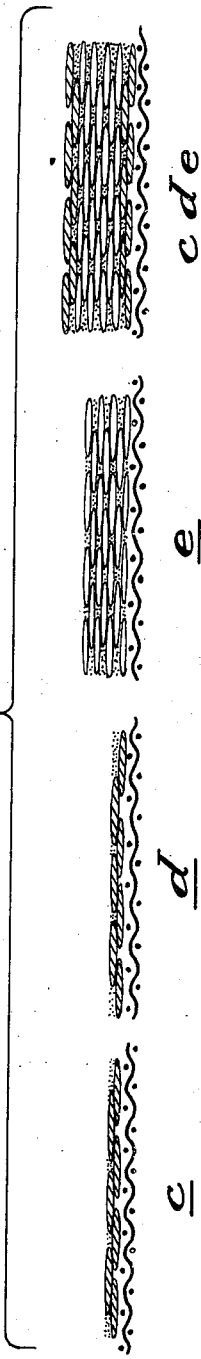
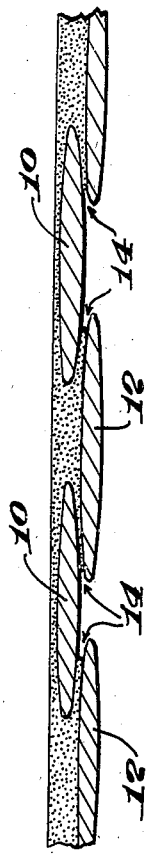
INVENTORS.
William R. Mansfield
BY Frank C. Hughes
J. Stanley Churchill, atty

UNITED STATES PATENT OFFICE 2,341,637

METHOD OF CONSTRUCTING OR BUILDING BONDED LAMINATED MICA INSULATION

William R. Mansfield, Cambridge, and Frank C. Hughes, Boston, Mass., assignors to Willis A. Boughton, Cambridge, Chester L. Dawes, Cambridge, William R. Mansfield, Cambridge, Frank C. Hughes, Boston, and Donald M. Hill, Newton, Mass., trustees of the Mica Patents Trust, Cambridge, Mass.

Application April 8, 1941, Serial No. 387,398

8 Claims. (Cl. 154—2.6)

This invention relates to novel and useful improvements in the methods of constructing or building bonded laminated mica insulation, as a step in the manufacture of composite bonded mica insulation.

The inventions described herein are, in general, improvements upon the methods heretofore commonly employed in the construction or building of all types of bonded mica insulation in plate or sheet form, and in particular, upon the method described by Boughton and Mansfield in United States Letters Patent No. 2,186,954, dated January 16, 1940, for use in the manufacture of composite high-temperature mica products.

The new methods of construction of bonded laminated mica insulation embraced in this invention are of outstanding value in that they effect not only substantial freedom of the outer faces of the surface layers of mica films from binder, thus producing higher surface resistivity and other desirable properties, but also freedom from surface scaliness and delamination, thus producing greater mechanical integration and compactness, and further, both of these effects may be attained without the use of extra size mica films as surface layers.

It is significant that the results accomplished by the methods embraced herein were contrary to expectation, and have been found by extensive investigation and tests to be of such importance and usefulness as to constitute a marked advance in the art of manufacture of composite bonded mica plate and in the properties of the products of manufacture.

The general object of the invention is to construct or build bonded laminated mica insulation in such a manner that the outer faces of the mica films comprising the surface layers will be substantially free of binder and the inner faces of the mica films comprising the surface layers will be completely adhered and firmly bonded to the adjacent interior layers of mica films.

Another object is to construct or build bonded laminated mica insulation in such a manner that the bonding compound may be applied in dry or powder form in such a manner as to produce complete and uniform distribution of the binder.

A further object is to construct or build bonded laminated mica insulation in such a manner that a minimum of binder solvent or dispersion medium will be incorporated in the insulation.

A specific object is to construct or build an inorganic-bonded laminated mica plate in such a manner that the composite bonded high-heat mica plate produced therefrom by suitable processing will have surfaces which are substantially free of binder and free from a tendency to flake or scale, with consequent enhancement of surface insulation resistance and of mechanical integration.

Another specific object is to construct or build an inorganic-bonded high-heat mica plate in such a manner that the composite bonded high-heat mica plate produced therefrom by suitable processing will be characterized by distinctive or unique markings or color effects.

Another specific object is to construct or build an organic-bonded laminated mica plate of the plastic or so-called "flexible" type in such a manner that the product of manufacture will be substantially free of surface tackiness and of surface scaliness.

A further specific object is to construct or build an inorganic-bonded laminated mica plate using a minimum of binder solvent or dispersion medium so that the composite bonded high-heat mica plate produced therefrom by suitable processing will yield less vapor or gaseous emission when subjected to conditions conducive to such emission, such as high temperatures and reduced environmental gaseous pressures.

To the accomplishment of these objects and of such others that may hereinafter appear, as will be readily understood by those skilled in the art, the invention comprises the features, combinations and processes of manufacture hereinafter described and then particularly pointed out in the appended claims.

In the drawing, in Figs. 1 and 2 we have illustrated more or less diagramatically, the successive steps in two methods of making the present composite bonded mica insulation, and in Fig. 3 an enlarged diagrammatic view of a single layer of mica film which may be utilized in practicing the method of Fig. 2.

The nature and scope of the invention will be understood from the following general description of the methods employed in the manufacture of mica insulation, and the novel and useful improvements made in these methods, aided by reference to the accompanying drawing.

In the manufacture of composite bonded mica insulation, the first step consists in the preliminary construction of the mica plate, which, as commonly practiced, comprises the bonding or cementing together of layers of mica films to the desired thickness with a suitable bonding or prebonding agent.

The layer or layers of mica may be composed of films of natural mica, such as Muscovite or Phlogopite, which are ordinarily used in the construction of composite bonded mica plate, or of some form of synthetic mica such as that which may be prepared by the treatment of aqueous suspensions of certain highly hydrated colloidal clays, such as bentonite, by means of centrifuging, passing through a colloid mill or a homogenizer, or by revolution in a ball mill, to produce greater uniformity of size or micelle than is naturally found in such aqueous suspensions, layering the gel so formed into suitable sheet form with or without the addition of various modifying agents, and dehydrating, either partially or substantially completely, by drying or heating under pressure, or a synthetic mica material made in any other way.

The bonding agent may be selected from the limited group of organic resinous adhesives and inorganic compounds which are capable of functioning as binders for mica, to produce mica plates which range in properties from plasticity at ordinary temperatures to complete resistance to change at temperatures up to and including dull red heat.

The preliminary construction of the mica plate may be effected manually or by machine, and although it will be clear that the principles embraced in this invention are applicable to both manual and mechanical methods of construction, we shall, for purposes of clarity, confine the description to methods of construction by manual operation. Further, the principles of the invention are more particularly applicable to the so-called "unmilled" types of bonded mica plate, for example, the plastic or "flexible" type, the organic-bonded heater plate, and the inorganic-bonded high-heat plate.

The method of manual construction commonly employed heretofore consists in scattering a layer of mica films of selected grade on a screen and covering this layer with a superficial layer of bonding agent in controlled amount, then applying alternate additional layers of mica films and binder until the desired thickness is obtained. The bonding agent may be applied as a binder liquid, dispersion or paste.

In the United States Patent No. 2,186,954, Boughton and Mansfield described, as a step in the manufacture of composite bonded high-heat mica plate, a method of construction in two halves, each half consisting of a plurality of layers of bonded mica films of ordinary size and one outer layer of oversize mica films, then bonding the two halves with the oversize mica films constituting the top and bottom layers of the completely formed plate. In their method, each half was built by scattering a layer of mica films of standard size on a screen, covering them with binder liquid, then applying additional alternate layers of mica films and binder liquid built up to almost one-half the desired thickness, then applying one or more layers of extra or oversize mica films.

The methods which we describe and claim herein differ essentially from that described by Boughton and Mansfield in that whereas they cause the top, or last layers of mica films (which, in their case, are oversize) applied in the construction of the two halves of the mica plate to serve as the two outer or surface layers of the mica plate when the two halves are combined, we use the bottom, or first, layers of mica films (which, in our case, need not be oversize) applied in the constructions of each section (or modifications of this method as described later) to serve as the two outer or surface layers of the mica plate when the two halves are combined.

Boughton and Mansfield stated that, using the prior art, smaller sizes of mica films as the surface layers and the ordinary method of building, the operator, regardless of skill, could not prevent the binder from a gravitational penetration to the outer surfaces, and they believed that as the result of this gravitational penetration, the binder liquid would seep through to the outer faces of the bottom, or first, layers applied on the screen in the construction of each half. They used the top, or last, layers of mica films (oversize) applied in the construction of each half, therefore, as the surface layers of the composite bonded mica plate when the two halves were combined, stating that because the gravitational trend is directed away from the top layers in the construction of each half, the outer faces of these layers remain binder-free when the two halves are combined, thereby producing significant improvement in the surface insulation resistance properties of the composite bonded mica insulation.

We have found, however, that although the top layers of mica films when so applied in the construction of each half and used as the surface layers of the composite mica plates as described by Boughton and Mansfield or when applied as so-called "dry layers" in the prior practice of building plate in one section and thus constituting one surface layer of the composite mica plate, produce binder-freedom of the two or one surfaces, respectively, these top layers must be applied in such a manner that they cover the surface with such completeness, in order to cover every "wet" or binder spot, that the films must necessarily be overlapped, in which case three unavoidably results an absence of binder and consequently of adherence at the points or areas of overlap, resulting in a tendency to chip, flake, scale or delaminate. Furthermore, these objectionable effects of overlapping can, by the above methods, be overcome only at the expense of leaving spots or areas of binder exposed on the surface.

On the other hand, it has been demonstrated by extensive investigation that when bonded laminated mica plates are constructed in accordance with the methods of this invention, the composite bonded mica plates exhibit not only a substantial binder-freedom of the outer faces of the surface layers, but also a complete bonding and adherence at all points of the inner faces of each mica film of the surface layers to the adjacent interior layers, and we have found that these joint beneficial properties of substantial binder-freedom and of complete adherence of the surfaces at all points cannot be attained by methods heretofore employed in the construction of composite bonded mica plate.

The results obtained by the use of our methods of construction do not confirm the effect naturally expected by Boughton and Mansfield, namely, of seepage through to the outer surfaces of the mica films comprising the bottom layers during the construction of each half of the bonded laminated mica plate, and we believe that this expected seepage is restrained by a surface tension action of the binder liquid between the surfaces of mica films, so that as the result of the gravitational trend toward the bottom layer, perhaps assisted by the mechanical pressure of the layers superimposed upon the bottom layer, the binder liquid is attracted by capillarity between the surfaces of the mica films to produce complete wetting of the inner faces of the bottom surface films and complete adherence of these films to the adjacent interior layers, but then, as the result of a surface tension action, or contractile surface force, together with the absence of a second wall necessary for the exertion of capillarity, seepage of the binder liquid beyond the edges of the mica films comprising the bottom layer is restrained. Regardless of whether the noted behavior is due to capillarity and surface tension actions, the results clearly demonstrate that composite bonded mica plates made in accordance with the methods of construction embraced in this invention do exhibit both substantial binder-freedom of the outer faces of the mica films comprising the surface layers and complete adherence of these films to the adjacent interior layers. Furthermore, it has been found that by the use of our methods of construction composite bonded mica plates possessing these joint beneficial properties can be made with any selected grade of mica films for both interior and surface layers.

In addition to the method specifically described earlier herein, various other modifications of methods for the construction of composite bonded mica plate, all of which are based upon the principles embraced in this invention. These modifications include, for example, the application of the bonding agent in a minimum of binder solvent or dispersion medium.

The following detailed descriptions of methods of construction are given primarily to illustrate the essential principles of the invention and should not, therefore, be taken as limiting or all-inclusive.

In these methods of construction, the operator uses three (Method I) or four (Method II) screens instead of one as in the ordinary method. The mica plate is constructed in two or three sections on two (Method I) or three (Method II) of the screens, and the remaining screen is used as a dry support for the combined sections forming the finished plate during subsequent processing.

These methods are applicable to the construction of all types of laminated bonded mica plate and are not, therefore, restricted to any particular type of mica plate or binder composition.

*Method I.*—In this method, the mica plate is built in two sections, such as halves. One section is built by layering mica films of any selected grade or size on a dry screen, to form a thin complete layer free of voids or uncovered spots, and covering them with a superficial layer of sprinkled, sprayed or painted binder liquid in controlled quantities. Additional layers of mica films are added with binder liquid between, until the section is built-up to the desired thickness. Binder liquid is then applied to the surface of the built-up section. The other section of the plate is built similarly on a similar screen. One of the sections is then inverted and thus placed in position upon the other section. This gives a combination of which the two layers of mica films which were first applied to the screens in the construction of each section now constitute the top and bottom layers of the composite bonded mica plate. The completely built so-called "green" plate thus assembled is then either slid or inverted onto a third dry screen which supports it for further processing.

As illustrative of various inorganic binders which we may use, the following may be mentioned: sodium metaphosphate; boron trioxide; and mixtures with sodium metaphosphate and borax or boron trioxide. Among the organic binders which we may use may be mentioned shellac, alkyd resins, and Manila copal gum with castor oil.

In Fig. 1, the two sections of the plate are represented by $a$ and $b$, and the combination of the two sections by $ab$. In sections $a$ and $b$, the striped units represent the mica films comprising the first layer applied to the screens, and the unstriped units represent the mica films comprising the additional layers applied in the construction of each section. The combination $ab$ illustrates that the layers of mica films which were first applied to the screens during the construction of each section constitute the top and bottom layers of the composite bonded mica plate $ab$ when the two sections $a$ and $b$ are combined.

The sections, as above described, are most conveniently composed of halves of the plate, but other proportions may be used. A single layer may, for example, constitute a section.

*Method II.*—In this method, the mica plate is built in three sections. The first section is built by layering mica films of a selected grade and size on a screen, to form a thin complete layer free of voids and uncovered spots, and covering them with a superficial layer of sprinkled, sprayed or painted binder liquid in controlled quantities. A second section is built similarly on a similar screen of mica films. A third section consisting of alternate layers of mica films and binder liquid is built up to the desired thickness. The third section is slid or inverted into position upon the first section, and the second section is then inverted and thus placed in position upon the top of the third section which has thus been combined with the first section. This gives a combination of which the two layers of mica films which were first applied to the screens and comprised the first and second sections now constitute the top and bottom layers of the composite bonded mica plate. The completely built so-called "green" plate thus previously assembled is then either slid or inverted onto a fourth dry screen which supports it for further processing.

In Fig. 2, the first section of the plate is represented by $c$, the second section by $d$, the third section by $e$, and the combination of the three sections by $cde$. In sections $c$ and $d$ the mica films are represented by striped units, and in section $e$ by unstriped units, in order to illustrate the positions of the layers of mica films in the combination $cde$. The combination $cde$ illustrates that the layers of mica films which comprised sections $c$ and $d$ constitute the top and bottom layers of the composite bonded mica plate $cde$ when the three sections $c$, $d$ and $e$ are combined.

In method II, the first and second sections, $c$ and $d$, are preferably composed of single layers of mica films, as described, with the third section, $e$, comprising the additional layers necessary to produce the desired thickness, but either or both of the first and second sections $c$ and $d$ may consist of more than one layer of mica films, in which case the number of layers comprising the third section $e$ is correspondingly reduced in order to produce the desired thickness.

An important advantage of this method of construction is in the improvement which is effected in the so-called "inspection" operation. This is an operation commonly employed in mica plate construction and consists in the approximate correction of thickness and density of the plate by the elimination of so-called "high spots" and "low spots." This operation necessarily incurs a certain amount of disruption of the original pattern created in the layering operations, and while the sections of plates constructed by Method I, can by the exercise of due care, be "inspected" without disturbance of the first layers of mica films applied to the screens, it is obvious that by Method II, "inspection" can, by being restricted to the third section e, be carried out more effectively, so that the first and second sections c and d remain entirely undisturbed.

The mica films used in the construction of the three sections may be of any selected grade and size.

A specific advantage of these methods of construction is the incorporation of novel and distinctive markings or colored effects. For example, in the manufacture of composite bonded high-heat mica plate, we may, in the preliminary construction in accordance with Method I, place strips or various-shaped forms of already-fused bonded high-heat mica plate, clear or colored or of other desired material, in desired positions on one of the constructed sections, so that when the other constructed section is inverted and placed in position upon this section, the said strips or various-shaped forms will constitute a pattern in the center of the plate. Then when the plate so constructed is suitably processed, the composite high-heat mica plate produced therefrom will have a distinctive marked or colored effect, which may serve, for example, as a trademarking.

In either method, colored bonding compositions may be used in the construction of any or all of the sections, to produce decorative color effects.

In both methods we may apply the bonding agent as binder liquid, as described, which may be a solution or dispersion of the bonding composition in a suitable solvent or liquid dispersion medium, or we may apply the binder as a dry powder in accordance with the following technique: In place of binder liquid at the specified positions, a fluid, for example, water, is sprinkled, sprayed or brushed on the layer of mica films, and the bonding composition in dry powder form is uniformly applied to the fluid layers in controlled amounts in a suitable manner, as by dusting. Solubility and capillarity factors provide proper distribution of the bonding composition. This method of application of the bonding composition in dry powder form has been found to be especially useful in effecting complete and uniform distribution of bonding compositions having relatively low solubilities. It further permits the incorporation of a minimum amount of binder solvent or dispersion medium, which serves to reduce vapor emission when the composite bonded mica plate is subjected to conditions conducive to such emission, for example, high temperatures and reduced environmental gaseous pressures.

The advantages of these methods of construction of laminated bonded mica plate insulation will be apparent to those skilled in the art. In the case of composite bonded high-heat mica plate constructed by these methods, the resulting substantial binder-freedom of the surfaces effects marked enhancement of electrical insulation resistance, particularly surface resistivity, which serves to reduce the current leakage of appliances in which the mica plate may be used as insulation. In the case of the plastic type of composite bonded mica insulation, substantial binder-freedom of the surfaces effects the elimination of deleterious surface tackiness. In addition to and in conjunction with the advantages of substantial binder-freedom of the surfaces, these methods, by effecting complete bonding and adherence of all points of the inner faces of the mica films comprising the surface layers to the adjacent interior layers, produce greater mechanical integration and eliminate the detrimental effects of chipping, flaking, scaling and delamination of the surfaces of the composite bonded mica insulation.

Composite bonded mica insulation constructed by the methods described herein have been found to be superior to any such material constructed by any method known to us.

The results obtained by the use of our method of making the present composite bonded mica insulation do not confirm the effect naturally expected by Boughton and Mansfield, as set forth in their patent above referred to, namely the seepage of the binder liquid through to the outer surfaces of the mica films comprising the bottom layers during the construction of each half of the bonded laminated mica plate. We have found that this expected seepage does not take place and believe that it is restrained by a surface tension action of the binder liquid between the surfaces of the mica films, so that as the result of the gravitative trend toward the bottom layer perhaps assisted by the mechanical pressure of the layers superimposed upon the bottom layer, the binder liquid is attracted by capillarity between the surface of the films to produce complete wetting of the inner faces of the bottom surface films and complete adherence of these films to the adjacent interior layers. As diagrammatically illustrated in Fig. 3, this surface tension action is thought to cause the fluid binder to flow between adjacent overlapping surfaces of two mica films 10, 12, and to terminate at the edge of the underlying film 12, as clearly illustrated at 14 in Fig. 3.

In the method illustrated in Fig. 1, the single layer forming the bottom layer of each of the sections a and b, is itself formed as above described and as shown in Fig. 3. In the method of Fig. 2, the sections c and d may each comprise a single layer or a built-up section.

For some purposes, materials other than mica may be used in building up the sections for forming the composite insulation, but in each case, mica films are layered to form the bottom surface of those sections which in the completed insulation comprise the top and bottom sections, thus providing the insulation with binder free mica upper and lower surfaces.

The methods of construction described herein may be readily applied to embrace also the manufacture of insulating materials comprising combinations of bonded mica and non-micaceous components such as paper, cloth, asbestos, fibrous glass, continuous resin films, coherent clay films, and similar materials.

Combination products comprising bonded mica and paper, cloth or asbestos are not new, but heretofore the non-micaceous component has generally served as a surface layer. Even, however, when the non-micaceous component has been incorporated as an intermediate layer between bonded mica layers, the assembly has not conformed to the provisions of this invention with respect to methods of construction and resulting improvements.

In accordance with the methods of construction described herein, such combinations are made as follows: According to Method I, the two bonded mica sections are built as described, then the selected non-micaceous component is placed in position on one of the sections, binder liquid is applied to the surface of the non-micaceous component, and the other bonded mica section is inverted and thus placed in position upon the non-micaceous component. This gives a composite assembly in which the non-micaceous material is intermediate the two outer sections of bonded mica, and of which the two layers of mica films which were first applied to the screens in the construction of each of the bonded mica sections now constitute the top and bottom layers of the composite assembly.

Similarly, in the construction of such combinations in accordance with Method II, the stated procedure may be readily modified so that the composite assembly includes a non-micaceous component intermediate any two or more of the bonded mica sections, and of which the two layers of mica films which were first applied to the screens in the construction of two of the bonded mica sections now constitute the top and bottom layers of the composite assembly.

It will be apparent that the methods embraced in this invention may be incorporated in any such composite assembly, irrespective of the number of bonded mica sections and of the number, nature, and location of non-micaceous components. The maximum number of non-micaceous sections is limited, of course, to one less than the total number of bonded mica sections in the composite assembly.

The non-micaceous component may be selected from a wide range of materials commonly employed for insulating purposes, and the following list is not intended to be limiting or all-inclusive: kraft paper, rope paper, tissue paper, fish paper, cheesecloth, linen, cambric asbestos, fibrous glass cloth, continuous resin films such as cellulose acetate, cellulose nitrate, polymerized vinyl ester resin, polymerized acrylic ester resin, and polystyrene resin, and coherent clay films. The non-micaceous component may be impregnated with an organic or inorganic insulating composition before incorporation into the assembly.

While the preferred methods for the production of the composite bonded mica insulation have been illustrated and described, it will be understood that other methods may be employed in accordance with the invention within the scope of the following claims.

Having thus described the invention, what is claimed is.

1. In a method of making composite bonded insulation having outer layers of mica, the steps which comprise, forming said insulation in at least two sections, each of said two sections being formed by arranging on a supporting surface a thin complete layer of mica films having overlapping portions and free from areas in which said surface is uncovered, applying binder to the upper surface of said layer in controlled amounts to cover said upper surface and provide for entrance of said binder between said overlapping portions of said films to bind said overlapping portions together without substantial seepage of said binder beyond the edges of the lowermost mica films of said layer, whereby the films of said layer are substantially completely bound together and the lower surface of said layer is substantially free of binder, and building up a composite bonded insulation structure in which said two sections form the outer sections of said structure and said lower surfaces of said two sections form the outer surfaces of said structure.

2. In a method of making composite bonded insulation having outer layers of mica, the steps which comprise, forming said insulation in at least two sections each of said two sections being formed by arranging on a supporting surface a thin complete layer of mica films having overlapping portions and free from areas in which said surface is uncovered, applying binder to the upper surface of said layer in controlled amounts to cover said upper surface and provide for entrance of said binder between said overlapping portions of said films to bind said overlapping portions together without seepage of said binder beyond the edges of the lowermost mica films of said layer, whereby the films of said layer are substantially completely bound together and the lower surface of said layer is substantially free of binder, and adding alternate layers of insulating material and binder to said first mentioned layer, and building up a composite bonded insulation structure in which said two sections form the outer sections of said structure and said lower surfaces of said two sections form the outer surfaces of said structure.

3. In a method of making composite bonded insulation having outer layers of mica, the steps which comprise, forming said insulation in two sections each of said two sections being formed by arranging on a supporting surface a thin complete layer of mica films having overlapping portions and free from areas in which said surface is uncovered, applying binder to the upper surface of said layer in controlled amounts to cover said upper surface and provide for entrance of said binder between said overlapping portions of said films to bind said overlapping portions together without seepage of said binder beyond the edges of the lowermost mica films of said layer, whereby the films of said layer are substantially completely bound together and the lower surface of said layer is substantially free of binder, adding alternate layers of mica films and binder to said two sections whereby the upper surfaces of said sections have either areas of uncovered binder or overlapping portions of unbound mica films and forming a final composite insulation structure by securing said upper surfaces of said sections together with a binder, whereby said lower surfaces of said sections form the outer surfaces of said structure.

4. In a method of making composite bonded insulation having outer layers of mica, the steps which comprise, forming said insulation in at least three sections, each of at least two of said sections being formed by arranging on a supporting surface a thin complete layer of mica films having overlapping portions and free from areas in which said surface is uncovered, applying binder to the upper surface of said layer is controlled amounts to cover said upper surface and provide for entrance of said binder between said overlapping portions of said films to bind said overlapping portions together without substantial seepage of said binder beyond the edges of the lowermost mica films of said layer, whereby the films of said layer are substantially completely bound together and the lower surface of said layer is substantially free of binder, forming a third section of alternate layers of insulating material and binder and binding said upper surface of one of said two sections to each of the surfaces of said third section to form a composite insulation structure in which said two sections form the outer sections of said structure and said lower surfaces of said two sections form the outer surfaces of said structure.

5. In a method of making composite bonded insulation having outer layers of mica, the steps which comprise, forming said insulation in at least three sections, each of at least two of said sections being formed by arranging on a supporting surface a thin complete layer of mica films having overlapping portions and free from areas in which said surface is uncovered, applying binder to the upper surface of said layer in controlled amounts to cover said upper surface and provide for entrance of said binder between said overlapping portions of said films to bind said overlapping portions together without seepage of said binder beyond the edges of the lowermost mica films of said layer, whereby the films of said layer are substantially completely bound together and the lower surface of said layer is substantially free of binder, and adding alternate layers of insulating material and binder to said first mentioned layer, forming a third section of alternate layers of insulating material and binder and binding said upper surface of one of said two sections to each of the surfaces of said third section to form a composite insulation structure in which said two sections form the outer sections of said structure and said lower surfaces of said two sections form the outer surfaces of said structure.

6. In a method of making composite bonded insulation having outer layers of mica, the steps which comprise, forming said insulation in at least three sections, each of at least two of said sections being formed by arranging on a supporting surface a thin complete layer of mica films having overlapping portions and free from areas in which said surface is uncovered, applying binder to the upper surface of said layer in controlled amounts to cover said upper surface and provide for entrance of said binder between said overlapping portions of said films to bind said overlapping portions together without substantial seepage of said binder beyond the edges of the lowermost mica films of said layer, whereby the films of said layer are substantially completely bound together and the lower surface of said layer is substantially free of binder, forming a third section of alternate layers of mica films and binder, said third section being thicker than each of said two sections and securing said upper surface of one of said two sections to each of the surfaces of said third section to form a composite insulation structure in which said two sections form the outer sections of said structure and said lower surfaces of said two sections form the outer surfaces of said structure.

7. In a method of making composite bonded insulation having outer layers of mica, the steps which comprise, forming said insulation in at least two sections, each of said two sections being formed by arranging on a supporting surface a thin complete layer of mica films having overlapping portions and free from areas in which said surface is uncovered, applying an organic binder to the upper surface of said layer in controlled amounts to cover said upper surface and provide for entrance of said binder between said overlapping portions of said films to bind said overlapping portions together without substantial seepage of said binder beyond the edges of the lowermost mica films of said layer, whereby the films of said layer are substantially completely bound together and the lower surface of said layer is substantially free of binder, and building up a composite bonded insulation structure in which said two sections form the outer sections of said structure and said lower surfaces of said two sections form the outer surfaces of said structure.

8. In a method of making composite bonded insulation having outer layers of mica, the steps which comprise, forming said insulation in at least two sections, each of said two sections being formed by arranging on a supporting surface a thin complete layer of mica films having overlapping portions and free from areas in which said surface is uncovered, applying an inorganic binder to the upper surface of said layer in controlled amounts to cover said upper surface and provide for entrance of said binder between said overlapping portions of said films to bind said overlapping portions together without substantial seepage of said binder beyond the edges of the lowermost mica films of said layer, whereby the films of said layer are substantially completely bound together and the lower surface of said layer is substantially free of binder, and building up a composite bonded insulation structure in which said two sections form the outer sections of said structure and said lower surfaces of said two sections form the outer surfaces of said structure.

WILLIAM R. MANSFIELD.
FRANK C. HUGHES.